(No Model.)

J. E. HENRIS.
SEEDER AND CULTIVATOR.

No. 253,285. Patented Feb. 7, 1882.

Witnesses
Geo. H. Strong.
Frank A. Brooks

Inventor
John E. Henris
By Dewey & Co. Atty.

UNITED STATES PATENT OFFICE.

JOHN E. HENRIS, OF DIXON, CALIFORNIA.

SEEDER AND CULTIVATOR.

SPECIFICATION forming part of Letters Patent No. 253,285, dated February 7, 1882.

Application filed August 12, 1881. (No model.)

*To all whom it may concern:*

Be it known that I, JOHN E. HENRIS, of Dixon, county of Solano, State of California, have invented an Improved Seeder and Cultivator; and I hereby declare the following is a full, clear, and exact description thereof.

My invention relates to that class of agricultural implements known as "seeders and cultivators," the object of which is to sow the seed and cover it up.

It consists in an appropriate wagon carrying a hopper containing regulating and feeding plates and opening out into spouts leading to receivers surmounting a rotating distributing-disk. Upon the rear of the frame are independent arms carrying adjustable cultivators. Appropriate mechanism receiving motion from the wheel operates the various parts, all of which will hereinafter more fully appear.

Figure 1:
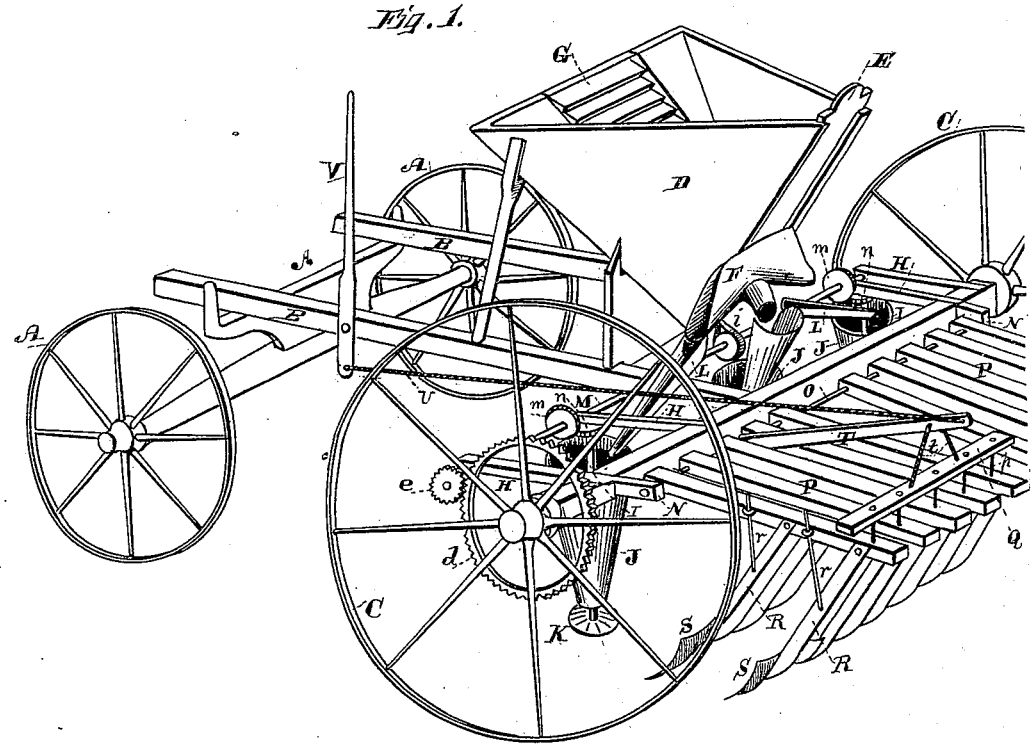
Figure 2:
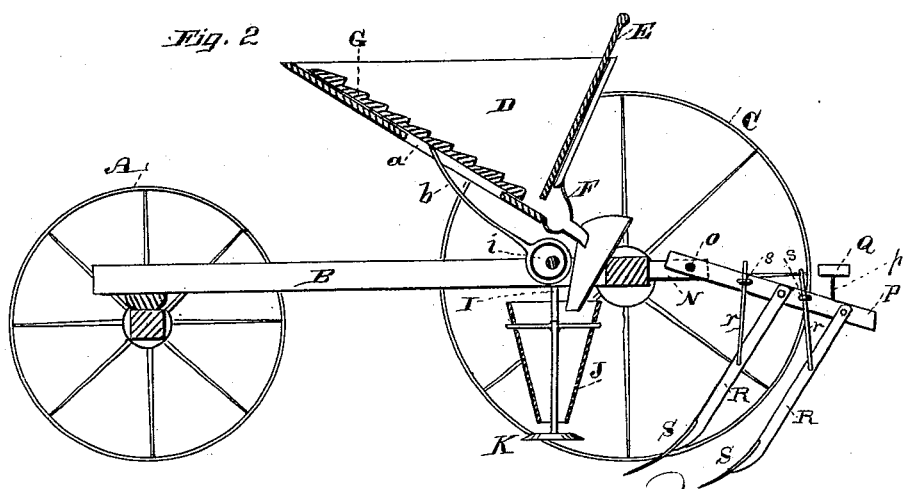

Referring to the accompanying drawings, Figure 1 is a perspective of my seeder and cultivator. Fig. 2 is a longitudinal section of the same.

Let A represent the front wheels and head-block of an ordinary farm-wagon, which can be applied to sustaining the frame B of my invention.

C are the wheels of the frame B.

Upon the frame is supported a hopper, D, having inclined ends, the rear end of which is closed by a sliding regulating-plate, E.

Upon the rear end of the hopper, at the bottom, is secured a threefold spout, F, its openings being at the two ends and at the middle, as shown.

Within the front side of the hopper is a feeding-plate, G, adapted to move up and down in side guides. This plate has its surface corrugated or notched transversely.

In the hopper, beneath the feeding-plate, is a slot, *a*, through which a rod, *b*, passes and is secured to the under side of the feeding-plate. Its other end extends rearwardly, and is attached as hereinafter explained.

Extending forwardly from the rear axle of the wheels C are supports or bearings H, in which are journaled vertical shafts or spindles I, to which are secured funnel-shaped receivers J. The lower ends of the receivers do not close tight about the shafts, but are open for the passage of the seed to fall upon the horizontal distributing-disks K, which are secured to the shafts I.

L L represent spouts or carriers supported by the frame-work and axle, and in relation with the openings of the spout F. They extend to and are in relation with the funnel-shaped receivers J.

The construction thus explained, my object is to give a vibratory motion to the feeding-plate G and a rotary motion to the distributing-disks K. This I accomplish as follows: Upon the inside of one of the wheels C is a large gear-wheel, *d*. This meshes with a pinion, *e*, upon a shaft, M, which extends parallel with the axle and is journaled in the supports H. This shaft has an eccentric, *i*, upon it, over which fits the looped end of the rod *b*, which is attached to the feeding-plate G. Motion is thus transmitted to this plate, and it moves up and down in the hopper as the machine advances. The shaft M carries bevel-gears *m*, which engage with bevel-pinions *n* upon the vertical spindles I. A rotary motion is thus given to the disks K.

The operation of the seeder is as follows: The seed is placed in the hopper and the regulating-plate E is so adjusted that a suitable opening is left in the bottom of the hopper. The feeding-plate moves up and down and gradually feeds the seed to the discharge. The seed drops through the three openings of the spout F and through the spouts L L into the funnel-shaped receivers J, from which it falls upon the rotating disks K and is sown broadcast.

Extending rearwardly from the rear axle are supports N, in which is secured a shaft, O.

P P represent arms, each loosely journaled upon the shaft O. These arms I prefer to have in two sets, one on each side of the center. Their outer ends are joined to cross-pieces Q by means of cords or chains *p*, each arm being joined by its own chains. Pivoted to each arm are the cultivator-shanks R, the ends of which have the cultivator-teeth S, as shown. Attached to the shanks are rods *r*, which pass up through staples *s* in the arms. This construction is to give to each cultivator an independent adjustment, so that it may pass over obstructions and yield to various inequalities of the ground. The rods are made long enough to allow considerable movement of the cultivators without coming out of the staples. When meeting a large obstruction it is desirable to have them yield, even to the extent of pulling out entirely, rather than have them break by resistance. The arms P P are supported by the bars T, to which the cross-pieces Q are attached by means of rods t. The forward ends of the bars T are notched, and are journaled upon the shaft O. Their rear ends have holes to receive cords U, which pass forward and are secured to the operating-levers V V on each side of the front of the frame. These levers are pivoted to the frame, and by their movement adjust the respective sets of arms P P so that the cultivators may be raised from or lowered to the ground.

The frame B is easily connected with the front wheels of a tongue-wagon by having a tongue in the usual manner, or in any other suitable way.

Having thus described my invention, what I claim as new, and desire to secure by Letters Patent, is—

1. In a seeder and cultivator, the hopper D, with its regulating-plate E, spout F, and reciprocating feeding-plate G, arranged at an angle, as shown, to accelerate the gravity-feed, substantially as herein described.

2. In a seeder and cultivator, the combination of the hopper D, with its regulating-plate E, spout F, and reciprocating feeding-plate G, arranged at an angle, as shown, to accelerate the gravity-feed, the spouts or carriers L L, funnel-shaped receivers J, and rotating distributing-disks K, substantially as herein described.

3. In a seeder and cultivator having the hopper D, with a slot, a, the feeding-plate G, rod b, supports H, eccentric i, shaft N, pinion e, gear d, and wheel C, when arranged substantially as and for the purpose herein described.

4. In a seeder and cultivator, the distributing-disks K, funnel-shaped receivers J, vertical shafts or spindles I, bevel-pinions n, supports H, shaft M, bevel-gears m, pinion e, gear d, and wheel C, when arranged substantially as and for the purpose herein described.

In witness whereof I have hereunto set my hand.

JOHN E. HENRIS.

Witnesses:
   PETER R. WILLOT,
   EMIL CHAVE.